Feb. 16, 1965 F. LAA ETAL 3,169,721

MAGAZINE FOR A MAGNETIC TAPE RECORDER/REPRODUCER

Filed Dec. 1, 1961 3 Sheets-Sheet 1

INVENTOR
FRIEDRICH LAA
FRIEDRICH LOUZIL
BY
Frank R. [signature]
AGENT

INVENTOR
FRIEDRICH LAA
FRIEDRICH LOUZIL
BY
Frank R. Jelfani
AGENT

MAGAZINE FOR A MAGNETIC TAPE RECORDER/REPRODUCER

Filed Dec. 1, 1961 3 Sheets-Sheet 3

INVENTOR
FRIEDRICH LAA
FRIEDRICH LOUZIL
BY
Frank R. Jeufau
AGENT

1

3,169,721
MAGAZINE FOR A MAGNETIC TAPE RECORDER/REPRODUCER

Friedrich Laa and Friedrich Louzil, Vienna, Austria, assignors to North American Philips Company, Inc., New York, N.Y., a corporation of Delaware
Filed Dec. 1, 1961, Ser. No. 156,275
Claims priority, application Austria, Dec. 9, 1960, 9,204/60
12 Claims. (Cl. 242—55.13)

Figures 1, 1A, 1B:
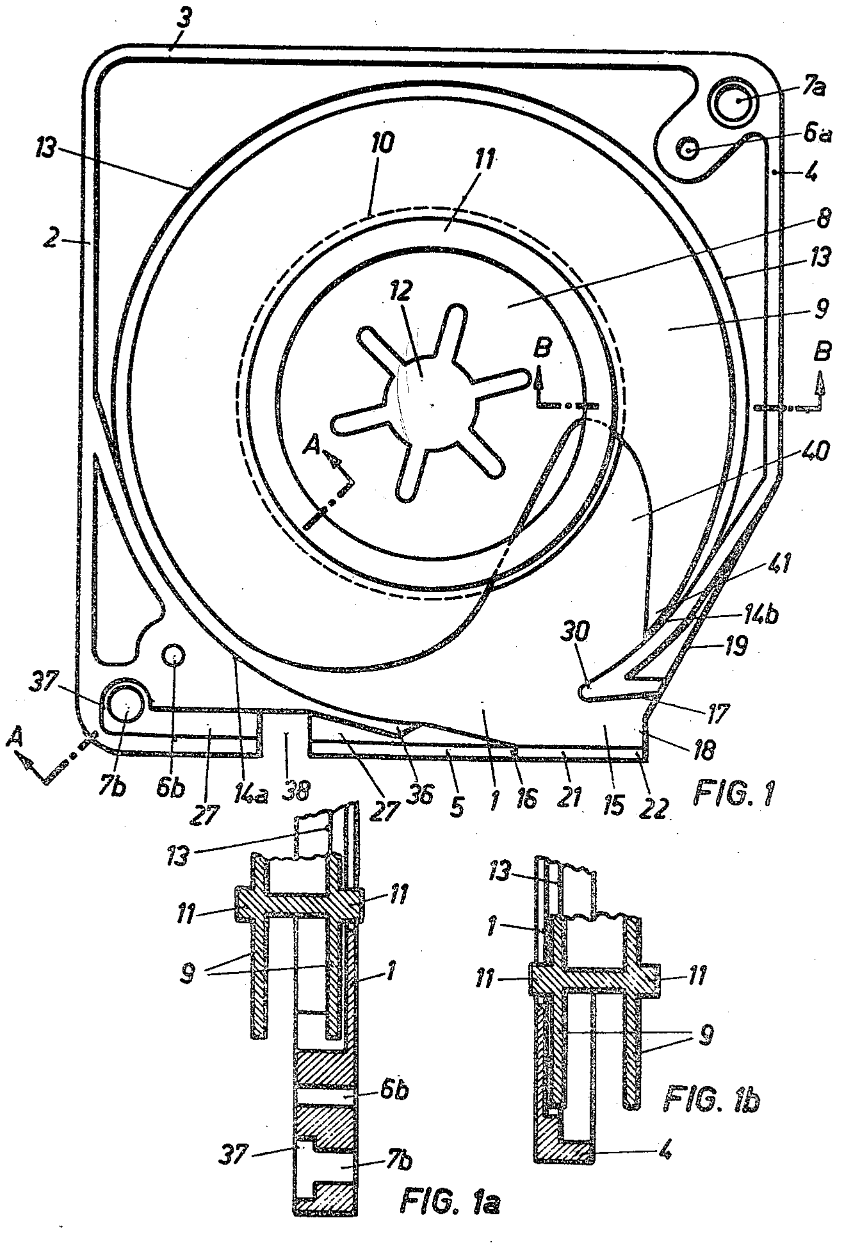

The invention relates to a magazine or casing for a tape-shaped record carrier and in particular a casing for a single spool of tape, having an opening in a side wall for the inlet or outlet of the tape, the tape being provided with an extension, which can be grasped by driving means.

In known devices of this kind the tape is wound on a spool or winding core, to which one end of the tape is secured so that during the winding-off operation the tape is not detached from the core, thus after a recording or, reproducing operation the tape can be rewound. In some known cases no measures at all have been taken to prevent the free end of the tape, during rewinding, from passing through the opening provided in the side wall of the casing so that it disappears in the magazine.

In other known cases an extension has been provided at the free end of the tape by means of which the tape is secured to a take-up or winding member, so that the supply can be wound off. The extension is broader or thicker than the tape to which it is secured, and the sectional area of the opening in the magazine is chosen so that the tape but not the extension can pass there through. During the rewinding operation therefore the extension cannot disappear in the magazine. However, the known arrangements do not at all guarantee that the tape will not emerge accidentally from the magazine, and become damaged. In order to avoid this danger it has been proposed to provide brakes in the magazine for the spool core, which brakes remain operative as long as the magazine is not used i.e. is not arranged on a suitable apparatus. It has furthermore been proposed to provide closing flaps or a slide at the opening of the magazine in order to hold the tape inside the magazine.

In accordance with the invention in a magazine of the aforementioned type, the lateral opening of the casing is formed as a channel extending tangentially with respect to the spool space and suitable for guiding the tape extensions, and communicating with this channel is at least one passage extending in a longitudinal direction. A blade spring is arranged in the longitudinal direction of the passage, one end of which is fixed in the side wall remote from the external channel opening, whereas the other, or free end of the spring, is located in the proximity of the external channel opening. At a given distance from the free end of this spring a bend or an extension or the like is provided for substantially or completely closing the channel, to prevent the extension, provided at the end of a wound tape from penetrating into the spool space, while at the same time holding the extension in the channel.

Preferably the spring is biased to move in a direction closing the internal channel and in the path of movement of said spring provision is made of a stationary stop, which limits the movement in the direction of the bias. In order to open the channel the magazine is provided, with a supporting bearing and between this supporting bearing and the fixed end of the spring the side wall of the magazine is provided with a recess through which the spring is accessible from outside of the magazine. The external channel wall may be formed partly by only two small ribs each on the upper and the lower channel wall and the width of the spring may be smaller than the distance between said ribs, the width of the spring gradually decreasing towards the free end. In the case of a substantially square shape of the magazine, one side wall thereof may constitute at the same time the external channel wall and the side wall of the magazine in which the channel ends may be sloped.

In a particular, further embodiment of the magazine the use of flange spools with one or more orthogonal cuts extending from the flange edges to the spool core with slanting sides is rendered possible by providing in the magazine, on either side of the internal channel opening, stationary wall portions closing completely the spool space in lateral direction, while the spring forms part of the lateral boundary of the spool space between the said wall parts. With this embodiment, in particular, the extensions of the tape are constructed in the form of wedges extending in the axial direction of the tape and having a width equal to that of the tape, the thick end of the wedge having on each side widened parts preferably formed by readily rotatable rollers, while the tape is secured, for example by adhesion, to one of the faces of the edge of the wedge, this wedge face being prolonged beyond the thicker wedge part by means of a thin, preferably wedge-shaped plate. It is advantageous to construct the thicker end of the wedge so that it has two laterally extending recesses, which preferably do not extend to the wedge face to which the tape is secured while the width of the spring part lying in the proximity of the passage of the external channel wall is preferably made smaller than the width of the wedge body between the recesses. It is advantageous to arrange the shaft of the rollers, in the case of a tangential arrangement of the two wedge faces to the rollers, inside the recesses so that a space is left behind the rollers by the provision of a smaller diameter of the rollers at least inside the recesses. It is furthermore advantageous to provide a recessed part in the back face of the thicker wedge part, said recessed part corresponding to the projecting shape of the bend of the spring.

The shape of the magazine according to the invention obviates the disadvantages of the devices hitherto known. It is ensured, by a minimum of trouble that the outer end of a tape coil can neither disappear in the magazine nor can freely emerge therefrom. The magazine according to the invention has furthermore, in particular, the advantage that many variations and embodiments are possible, so that the possibilities of use are particularly great. The structure of the parts in accordance with the invention provides highly different embodiments, which are particularly capable of matching the special requirements of practice. For example, a detachable or a fixed connection on the tape to the spool core or an

2 embodiment may be used, at will, in which a tape introduced into the magazine is automatically secured to the spool core.

The invention will now be described more fully with reference to the drawings. However, the invention is not restricted to the embodiments shown in the drawings.

FIG. 1 of the drawing is a plan view of one half of the casing of a magazine according to the invention with a flange spool arranged therein.

FIGS. 1*a* and 1*b* are sectional views of the device shown in FIG. 1 taken on the lines A—A and B—B.

Figures 2, 3A:
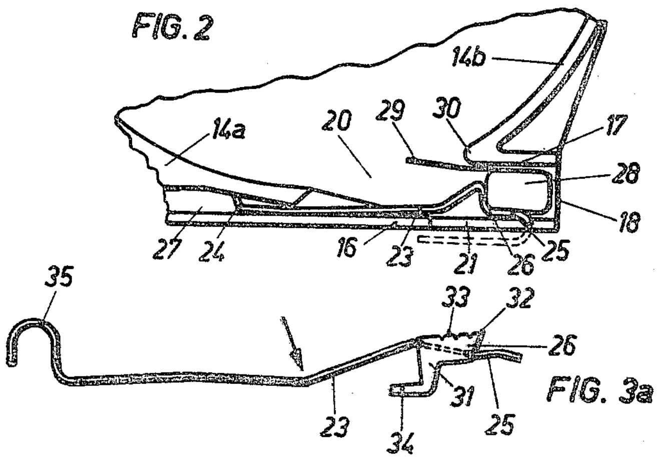

FIG. 2 is a plan view of part of one half of a casing comprising a blade spring shaped in accordance with the invention.

FIG. 3*a* is a side elevation of a modified blade spring according to the invention.

Figure 3B:
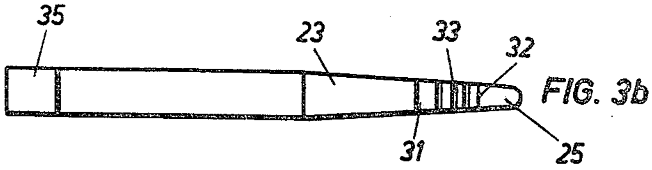

FIG. 3*b* is a plan view of the blade spring according to FIG. 3*a*.

Figure 4A:
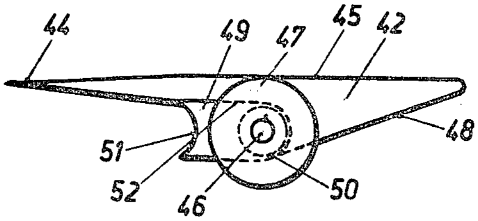

FIG. 4*a* is a side elevational view of a particular tape extension according to the invention.

Figure 4B:
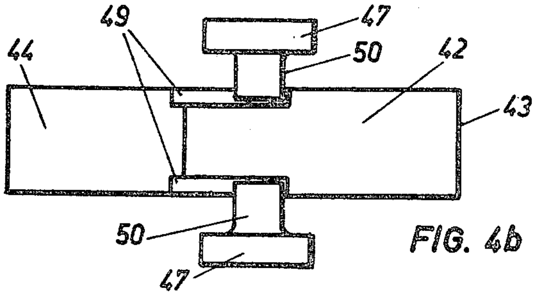

FIG. 4*b* is a plan view of the tape extension illustrated in FIG. 4*a*.

Figure 5A:
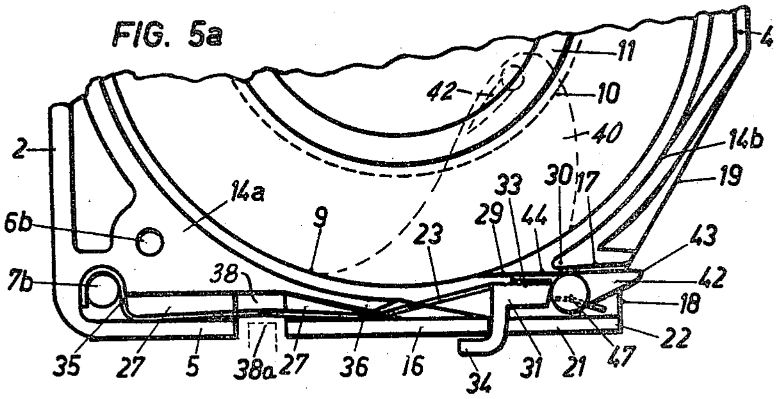

FIG. 5*a* is a plan view of part of one half of a magazine illustrating the arrangement of the blade spring according to FIG. 3*a* and the tape extension of FIG. 4*a* with a magazine.

Figure 5B:
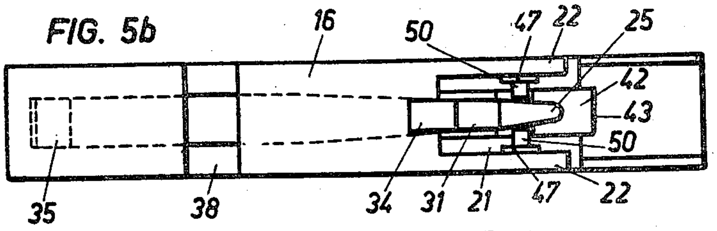

FIG. 5*b* is a bottom view of the magazine according to FIG. 5*a*.

Figure 6:
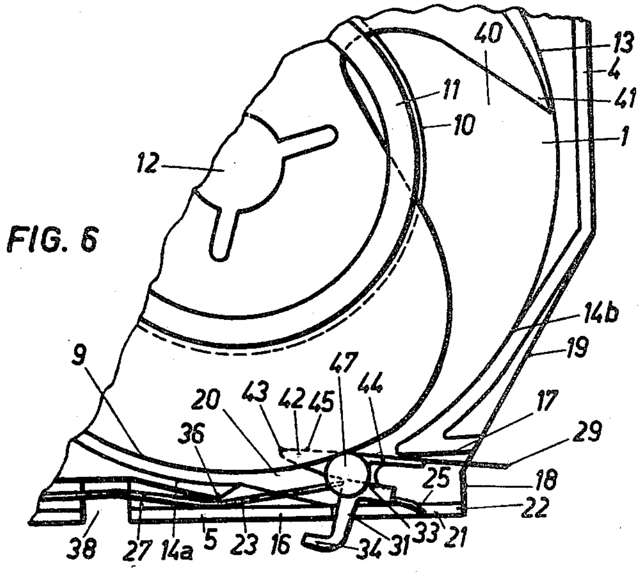

FIG. 6 is a plan view of part of one half of a magazine having a spring and a spool as shown in FIG. 5*a*, however with an extension as shown in FIG. 4*a* at the beginning of a tape.

The magazine casing in the embodiments shown comprises two box-shaped halves, one being the reflection of the other and being made, for example from a synthetic substance. The bottom or the lid 1 of the casing has a substantially square shape. The side walls 2, 3, 4 and 5 enclose the inner space of the casing and determine the height thereof. In order to hold the two halves of the casing for example by means of screws or the like, openings *6a* and *6b* are provided. The openings *7a* and *7b* serve for accommodating guide pins or the like, which determine the position, of the casing when it is arranged on a recorder/reproducer or driving member.

In such a casing spools of different shapes may be rotatably arranged in several ways. The embodiment shows a spool 8, which has, on the flanges 9, annular extensions 11 for a course centering in openings 10 of the casing and central openings 12 for an accurate centering on a spool disc. The space occupied by the spool in the box is limited on the side by cylindrical wall portions 13. The wall portions 13 limit this space only to the height of the flanges 9, i.e. do not extend between the flanges. Thus, in the event of disturbances in the winding-up member, the tape may form loose loops between the flanges of the spool but the loops do not enter into the space between the interior sides of the casing and the adjacent flange, where it could be jammed. The wall portions **14*a* and 14*b***, shown in FIG. 1 laterally close the spool space but are not required for a magazine according to the invention in its simplest form. The purpose thereof will be explained more fully hereinafter.

A channel 15 is arranged tangentially to the space occupied by the spool 8, this channel leading to the spool space inside the casing. On the top side and on the bottom side this channel is limited by the bottom and the lid 1 of the casing; the outer wall 16 is formed by the side wall 5 of the casing. The side wall 17 on the rear side is provided separately in the casing. The channel opening 18 in the embodiment shown is not provided directly in the side wall 4 of the casing, but in an oblique portion 19. Thus the length of the channel is reduced to the desired size. The channel opening is designated by 20. In the embodiment shown the channel is located inside the casing. If the casing had a circular shape, the channel had to be provided on the outer side. In order to render the inside of the channel accessible also from the outer casing wall 16, the said wall has a passage or slot 21 extending in the longitudinal direction up to the external channel opening 18 (see FIG. 5*b*). In the proximity of the passage 21 only two small ribs 22 on the upper and the lower channel wall respectively are left of the side wall 16.

In order to close the channel 15 provision is made of an elongated member or spring 23 (FIG. 2). One end 24 of the spring 23 is fixed in line with the side wall 16 of the channel. The free end 25 protrudes forwardly inside the channel 15 and has a bend 26, which substantially closes the channel. The outer end of the spring is preferably bent over slightly to the outer side. In order to secure the end 24 of the spring in the casing, each half of the casing of the embodiment shown has a depression 27 between the wall portion **14*a* and the side wall portions 5, 16. The depth of the depression 27 is equal to half the width of the spring. The end 24** of the spring may, of course, be fixed in a different way.

FIG. 2 shows how an extension 28, provided at the end of a tape 29 and liable to be drawn into the magazine, when the tape is wound up on the spool in the magazine, is prevented by the spring 23 not only from entering the spool space but also from getting out of the channel 15. When the extension 28 enters the channel 15, which is facilitated by the slightly bent-over end of the spring, the spring 23 is urged forwards and thus stressed, so that the spring urges the extension against the rear channel wall 17. Further movement of the extension to the interior is prevented by the bend 26.

In the rest position the spring 23 leaves a free slot, in front of the channel wall 17, for the unhindered passage of the tape. In the embodiment shown the extension has an approximately square shape. The size of the extension corresponds with that of the channel, so that the walls of the latter constitute a guide for the extension.

Through the passage or slot 21 an extension 28 located in the channel 15 can be grasped from the side 16. Thus the direction in which the extension 28 is withdrawn from the channel 15 is independent of the gripping means. There are various possibilities of grasping the tape. A gripper, for example a forked piece (not shown) can grasp the extension 28 behind the side remote from the channel opening and carry it along, when moved to the right. The spring 23 must not close the whole passage 21 in this case. As is particularly indicated in the embodiment of FIG. 5*b* the width of the spring 23 must be smaller than the width of the passage 21. With a differently shaped gripper the spring may be wider than the passage, while the spring is provided with a longitudinal cut, so that two tags are formed. A further possibility consists in that the channel and the extension have such a length that the extension can be grasped in front of the end of the spring; the operation is then completely independent of the width of the spring. In all those cases the extension of the tape can be effectively grasped, while the extension is prevented from penetrating into the casing or from emerging from the channel at an inconvenient instant. It is unimportant in this case how the inner end of the tape is secured or how the spool is constructed.

By a more accurate shape, particularly of the spring, but also of certain parts of the magazine the device may be further improved and the domain of use may be enlarged. If the spring is shaped in the form shown in FIG. 2, there must not be a particular bias or movement of the spring towards the interior, since otherwise the spring would force the tape against the channel wall 17 during the winding-up or winding-off operations. Thus the spring holds an extension 28 in the channel only by means of the force determined by the spring deformation. Sometimes this force will not be too small and will remain active, when the extension has to be removed from the channel. It is therefore more advantageous to provide a bias of the spring towards the internal channel 17, while in the travel of the extension provision is made of a stationary stop, which limits the movement in the direction of the bias so that the tape can travel along the wall 17 without being pressed thereagainst. To this end the free end of the spring 24, as is indicated in FIG. 2 by broken lines, may be bent over so that, in the rest position of the spring, the reversed end engages the external channel wall 16, which constitutes the stop in this case. The bend 26 of the spring must have a steep side towards an extension 28. However, a steep projection cannot be obtained easily with flexible material. It is therefore efficacious to form this extension on the spring by a body, for example of a synthetic substance applied by spraying.

This body may, as an alternative, be formed so that it constitutes at the same time the part abutting against the stop (FIG. 3). Thus the pressure exerted on a tape extension lying in the channel may be chosen very high. It is, of course, efficacious to provide that this pressure is completely obviated or at least strongly reduced, when the magazine is employed, i.e. when the magazine is arranged on an apparatus.

In a practical embodiment of the general measures described above the spring 23 is provided, as will be seen from FIG. 3, with a body 31 of a synthetic substance, which has a step shaped face edge 32 on the side of the bend 26, the said step shaped edge forming a sharply projecting part.

When the tape extension is adapted to the shape of the said edge, the extension can be prevented with certainty from entering the casing. The face 33 of the part 31 facing the spool space is provided with milling for reasons to be described hereinafter. The hook-like extension 34 of the part 31 engages, in the rest position of the spring, the side wall 5 of the casing. For fixing purposes the spring 23 is supported only at the place indicated by the arrow (FIG. 3*a*), whereas it is secured at the end 35. To this end the groove 27, described above, (FIG. 1) provided in the casing between the wall portion 14*a* and the side wall 5 of the magazine, is shaped so that a supporting bearing 36 is formed, which corresponds to the spring portion indicated by the arrow. The openings 7*b* have a larger diameter at the upper part 37 for accommodating the semi-circular end 35 of the spring. Between the fixpoint thus obtained and the supporting bearing or fulcrum 36 the spring is free and by providing the recess 38 in the side wall 5 of the magazine the spring is accessible from outside the magazine. When the spring is urged to the inner side at recess 38, which may take place automatically by means of a pin 38*a* (FIG. 5*a*) when the device is arranged on an apparatus, the pressure exerted by the body 31 on a tape extension 28 in the channel 15 is completely obviated, when all further parts are chosen as stated above. The free end of the spring is again slightly bent over to the outer side.

As stated above, the magazine according to the invention may be constructed so that for the automatic establishment of a detachable connection of the end of a tape to a spool core it is sufficient to insert this end of the tape into the magazine. To this end use is made of a flange spool in the magazine, these flanges having one or more recesses extending radially from the edge to the spool core and having slanting edges. Such a recess 40, which forms a passage is indicated in the spool 8 of FIG. 1. An extension, extending in its direction of width sideways beyond the relative distance between the flanges of the spool, is carried along, after its introduction into one of the recesses, when the spool is turned and shifted towards the spool core and held at this position. The magazine has the aforesaid stationary wall portions 14*a* and 14*b*, which completely close the spool space on either side of the internal channel opening 20; the spring 23 is shaped in a form such that it constitutes parts of the lateral boundary of the spool space, between the wall portions 14*a* and 14*b* (FIG. 5). Thus the tape extension, when it has passed by the bend 26 and when the passage 40 is not lying just behind the channel opening 20, is first urged against the flange edge and finally, when the spool is turned, introduced into the passage 40. It is particularly advantageous to use a spool in which the hook shaped flange parts 41 serving for capturing the tape extension are fixed to the wall portions 14 by enlarging the radius of the flanges at portion 41.

In principle, by withdrawing the spring 23 to the outer side, any tape extension can be introduced into the internal channel opening 20. However, it is more advantageous to provide particularly shaped tape extensions which do not require a special withdrawal of the spring. Therefore the tape extension used is a mainly wedge-shaped body, the sharp edge of which can penetrate between the spring 23 and the wall 17 to an extent such that the thicker end, to which the tape is secured, is urged by the spring 23 inside the channel opening 20 against the flange edges. When the spool is turned in the direction of the hook-shaped parts 41, the extension is taken along by these projecting parts and conveyed to the spool core in the manner described above.

If the magazine has to meet the severest requirements, the shape of the tape extension must fulfil the following conditions. The extension must have a shape such that it can be easily and safely grasped by a gripper for inserting it into a channel opening or for removing it therefrom; it must be prevented, when a tape is rewound, from ever disappearing into the magazine. The tape must be fixable easily and safely to the extension and the friction between the tape extension and the flange edges of a rotating spool must be minimized.

The extension fulfilling all these conditions is shown in FIGS. 4*a* and 4*b*. The body proper is formed by a wedge portion 42, for example of a synthetic substance, of which the edge 43 is located in the plane of the tape 29. The width of the wedge 42 and of the edge 43 thereof is equal to the width of the tape. In order to secure the tape, for example by adhesive, the thicker end of the wedge is provided with a thin, also wedge shaped plate 44, so that the wedge face 45 is prolonged to the rear. On a shaft 46, extending parallel to the wedge edge two rollers 47 are readily rotatable so that the rollers extend into the plane of the wedge face 45. If the particular shape of the embodiment shown is not chosen, also the second wedge face 48 should extend into the plane of the rollers 47. The diameter of the rollers 47 exceeds the distance between the edges of the flanges 9 and the wall portions 14*a* and 14*b*. The height of the wedge and of the rollers together is equal to the distance between the outer flange faces plus the play between the spool and the bottom and the lid of the magazine. The topmost and the lowermost wall of the channel 15, as stated above, are formed by the bottom and the lid of the magazine; the internal distance between the wall 17 and the wall 16 or the ribs 22 is equal to the diameter of the rollers. The thicker end of the wedge body is provided with two recesses 49, so that the width of the wedge body is reduced. The recesses 49 do not extend to the surface 45. The rollers have a smaller diameter on their sides facing the wedge. The radius is chosen so that the roller portion having the smaller diameter extends to the plane of the second wedge face 48. The rear face 51 of the wedge is concave, so that the bend 26 of the spring 23, particularly when it protrudes to the front (see FIG. 3*a*) can by no means be passed by, when the wedge penetrates into the channel with this concave face 51 first.

It is particularly advantageous to provide the recesses 49 and to shape the spring 23 so that the width of the spring portion in the proximity of the passage 21 in the outer side wall 16 of the channel is smaller than the width of the wedge body in the proximity of the recesses 49, irrespective of the fact whether the wedge, in front of the recesses, is widened by rollers or by stationary parts. A fork-shaked gripper (not shown) can, owing to these recesses, be slipped not only behind the thicker end of the wedge but also embrace the wedge end itself and guide it. When the gripper is introduced under spring pressure into the passage, which may be required under certain conditions, it is found to be very advantageous, when the recesses are not prolonged to the wedge face 45. Thus a supporting face 52 is formed for a fork-shaped gripper, which face leaves a large amount of play for the fork, particularly when the face 45 is prolonged by a plate 44. (FIG. 5). The provision of rollers for widening the wedge is advantageous since the friction of the extension introduced into the channel (FIG. 6) and abutting the edges of the spool flanges 9 of the rotating spool within the passage 40 of the spool as indicated by phantom lines in FIG. 5*a* prior to being withdrawn from the magazine is thus sharply reduced. The milling of the face 33 helps in holding the extension inside the channel. The provision of rollers having different diameters has important advantages, if a fork-shaped gripper is to be introduced not only by a movement at right angles to the outer wall 16 of the channel directly through the passage 21, but also by a movement parallel to the side wall 16 of the channel from the outer opening 18 into the correct position behind the rollers. In this case the resilient fork must slide with its prongs first along the wedge face 48 and arrive over the rollers behind the latter. When rollers with different diameters are used, the wedge face 48 is less steep, so that the gripper can more readily slide on them and the lifting movement of the gripper is smaller.

What is claimed is:

1. A magazine for a magnetic tape having at least one extension member attached thereto at the outer end thereof comprising a casing member having a space therein for receiving a rotatable spool adapted to coil and uncoil magnetic tape, means associated with said casing for defining a lateral inwardly extending channel substantially tangential to said space, said channel being dimensioned to allow said extension to pass freely therethrough, an elongated member operatively connected with said casing having a movable portion projecting into said channel for preventing passage through said channel of an extension trailing tape entering said casing, said extension and moveable portion of said elongated member being conformed for moving said movable portion for allowing passage through said channel of an extension leading tape to the interior of said casing.

2. A magazine according to claim 1 wherein said leading extension comprises a generally wedge shape body.

3. A magazine according to claim 1 with the addition of means for moving said movable portion for allowing passage of an extension through said channel comprising a fulcrum associated with said casing in engagement with said elongated member between said movable portion and the end of said elongated member associated with said casing, an opening in said casing exposing said elongated member between said fulcrum and the end of said elongated member associated with said casing and means receivable in said opening for stressing said elongated member about said fulcrum and moving said movable portion into a retracted position.

4. A magazine for a magnetic tape having at least one extension member at one end thereof comprising a hollow casing member having a spool rotatably mounted therein and adapted to coil and uncoil magnetic tape, means connected with said casing for defining a lateral channel extending inwardly of said casing and substantially tangential with the periphery of said spool, said channel being dimensioned to allow said extension to pass freely therethrough, resilient means operatively connected with said casing having a movable portion projecting into said channel for preventing passage through said channel of an extension trailing a tape entering said channel for coiling on said spool, said movable portion having a surface for removably securing a trailing extension within said channel, and means for moving said movable portion into a retracted position for allowing passage through said channel of an extension.

5. A magazine for a magnetic recorder/reproducer comprising a hollow casing member, a spool having a coil of magnetic tape rotatably supported within said casing member, means connected with said casing for defining a lateral channel extending inwardly from the exterior of said casing to the interior thereof and substantially tangential with the periphery of said spool, a tape extension in said channel connected to one end of said tape, said channel being dimensioned to allow said extension to pass fully therethrough, resilient means operaively connected with said casing having a movable portion biased into said channel for obstructing passage of said extension through said channel, said movable portion having a surface for removably securing said extension in said channel, and stop means engaging said movable portion for providing a passage through said channel for said tape when said extension is removed from said channel.

6. A magazine according to claim 5 wherein said movable portion comprises a generally inverted U-shaped wire and said stop means comprises an elongated slot in said casing adjacent said channel, said wire terminating in a reverse bend portion located in said slot and engageable with said casing adjacent the inner end of said slot.

7. A magazine according to claim 5 wherein said movable portion comprises a spring, a body suspended on said spring in said channel having a projection, and said stop means comprises a slot in said casing adjacent said channel receiving said projection, and a hook-like extension connected with said projection and engageable with said casing adjacent the inner end of said slot.

8. A magazine according to claim 5 wherein said extension comprises a body portion of wedge shape, and a plate portion extending from the base of said body portion prolonging a wedge surface, said tape being adhered to said plate portion, said wedge and plate portions having a width substantially equal to the width of said tape, and lateral extensions substantially parallel with the said wedge surface for engaging the flanges of said spool.

9. A magazine according to claim 8 wherein said lateral extensions comprise rollers having a diameter at the extremities remote from said body portion greater than the diameter thereof adjacent said body portion, and laterally extending recesses in said body portion adjacent the roller portion of least diameter.

10. A magazine according to claim 9 wherein the base of the wedge shaped body portion is concave for receiving the inverted U-shaped wire.

11. A magazine for a magnetic tape recorder/reproducer comprising a hollow casing member, a spool having a coil of magnetic tape rotatably supported within said casing member, said spool having radially extending side flanges, said flanges having coextensive slots therein for receiving a tape extension, means connected with said casing for defining a lateral channel extending inwardly from the exterior of said casing to the interior thereof and substantially tangentially with the periphery of said flanges, a tape extension connected with each end of said tape, one said extension residing within the inner end of said slotted spool and the other of said tape extensions residing in said channel, said channel being dimensioned to allow said extension to pass freely therethrough, means operatively connected with said casing having a portion movable within said channel engaging the other of said extensions for obstructing passage of said extension to the interior of said casing and removably securing said other extension within said channel, and stop means connected with said last named means for engaging said casing for limiting movement of said last named means into said chanel when said extension is removed from said channel.

12. A tape extension for magnetic tape comprising a wedge shaped body portion, a plate portion extending from the base of said body portion and having a surface in the plane of one of the wedge surfaces of said body portion, a pair of laterally extending rollers supported on said body portion, said rollers, each said roller having a large diameter portion and a reduced diameter portion, and a lateral recess in said body portion receiving said reduced diameter portion of said rollers.

References Cited by the Examiner

UNITED STATES PATENTS

| | | | |
|---|---|---|---|
| 2,837,332 | 6/58 | Busch | 242—55.19 |
| 2,963,940 | 12/60 | Raabe | 206—52 X |
| 3,006,650 | 10/61 | Ellmore | 242—55.13 |

MERVIN STEIN, *Primary Examiner.*

RUSSELL C. MADER, DONALD W. PARKER, JOSEPH P. STRIZAK, *Examiners.*